(12) United States Patent
McCausland, Jr.

(10) Patent No.: X9377
(45) Date of Patent: Feb. 10, 1836

(54) IMPROVEMENT IN THE SLIDE VALVE OF STEAM ENGINES

(76) Inventor: Alexander McCausland, Jr.

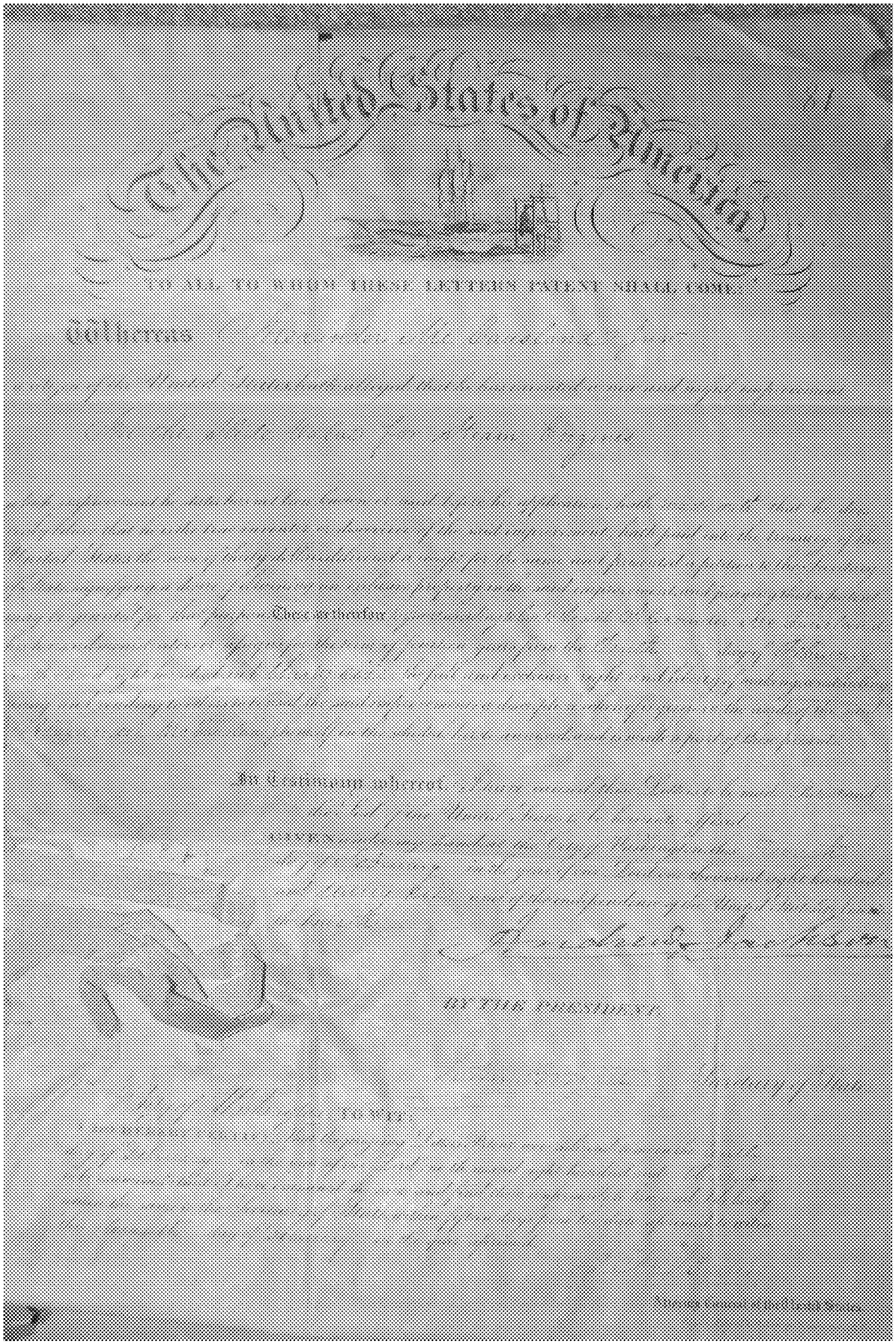

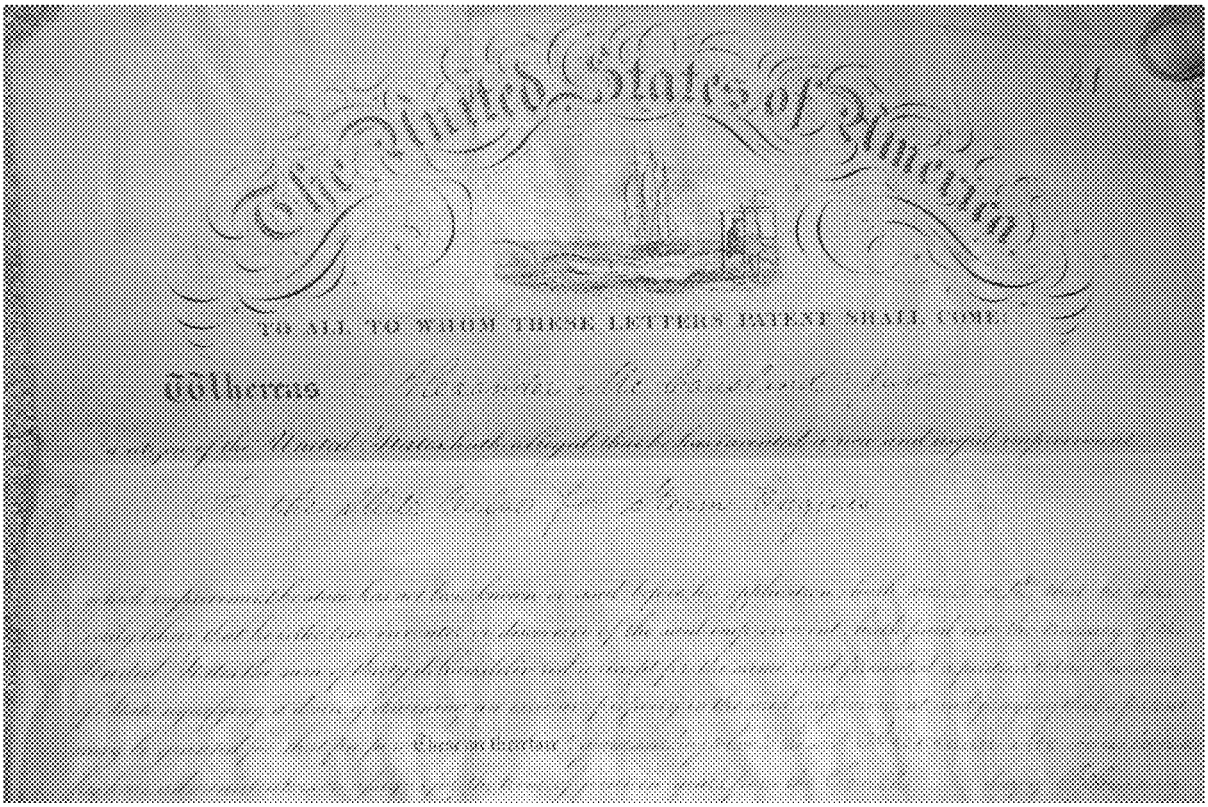

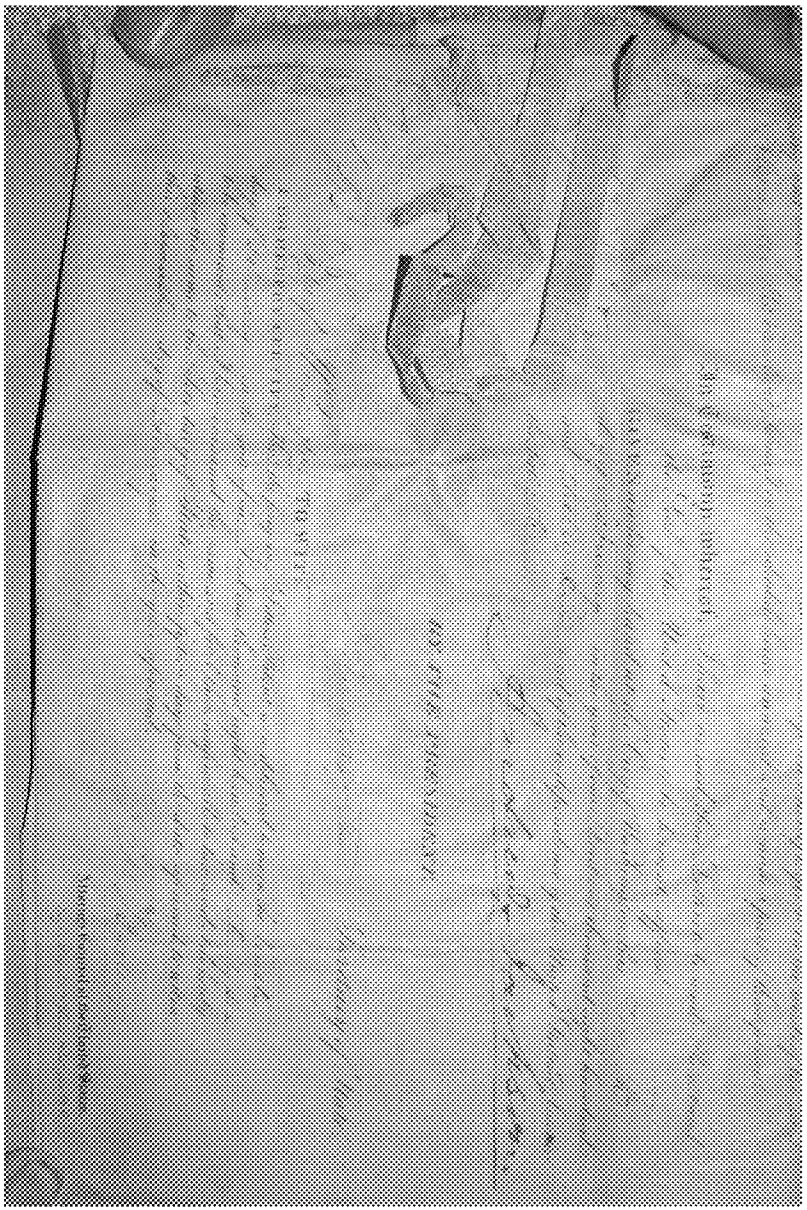

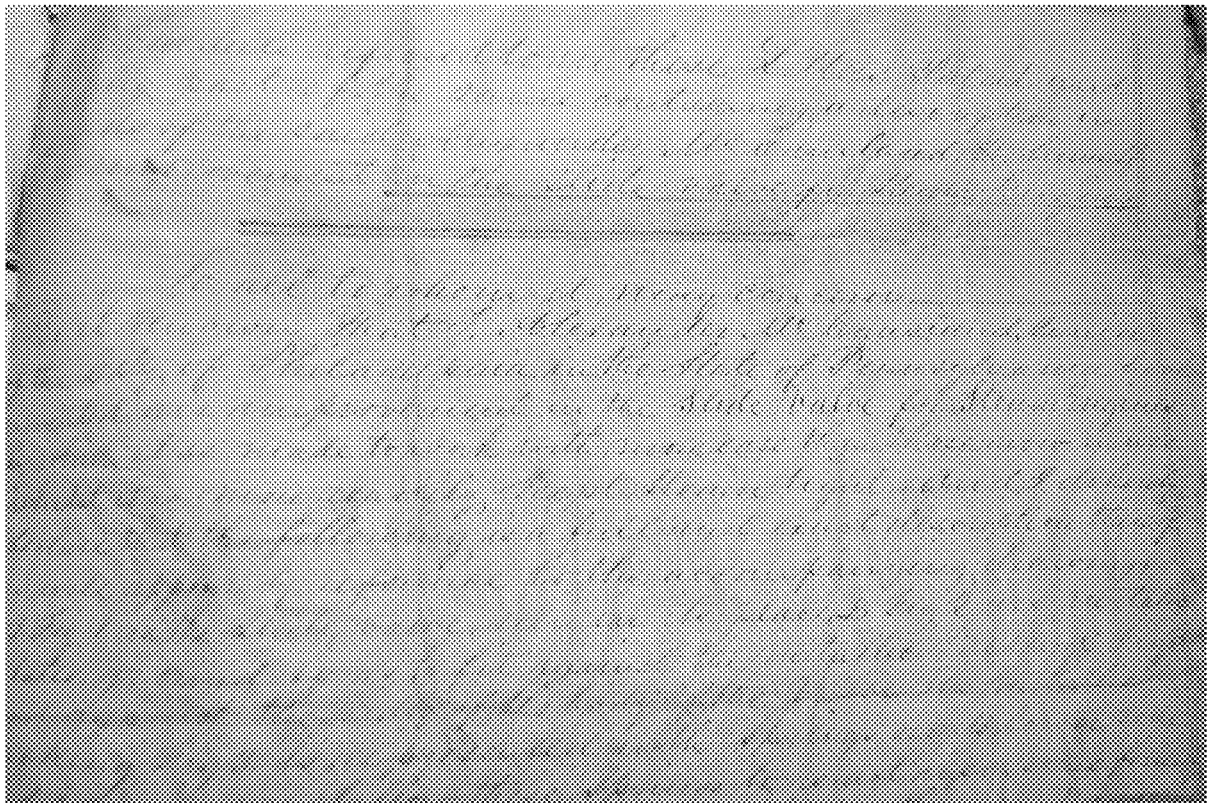

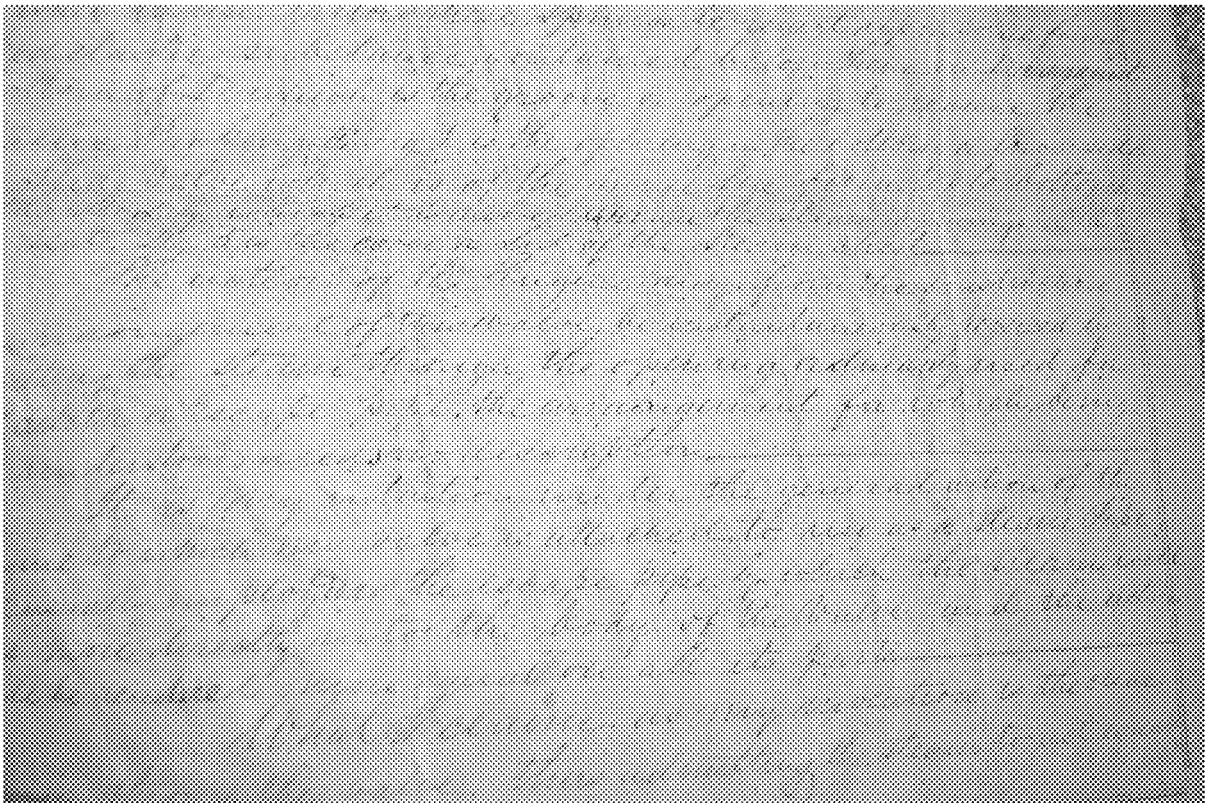

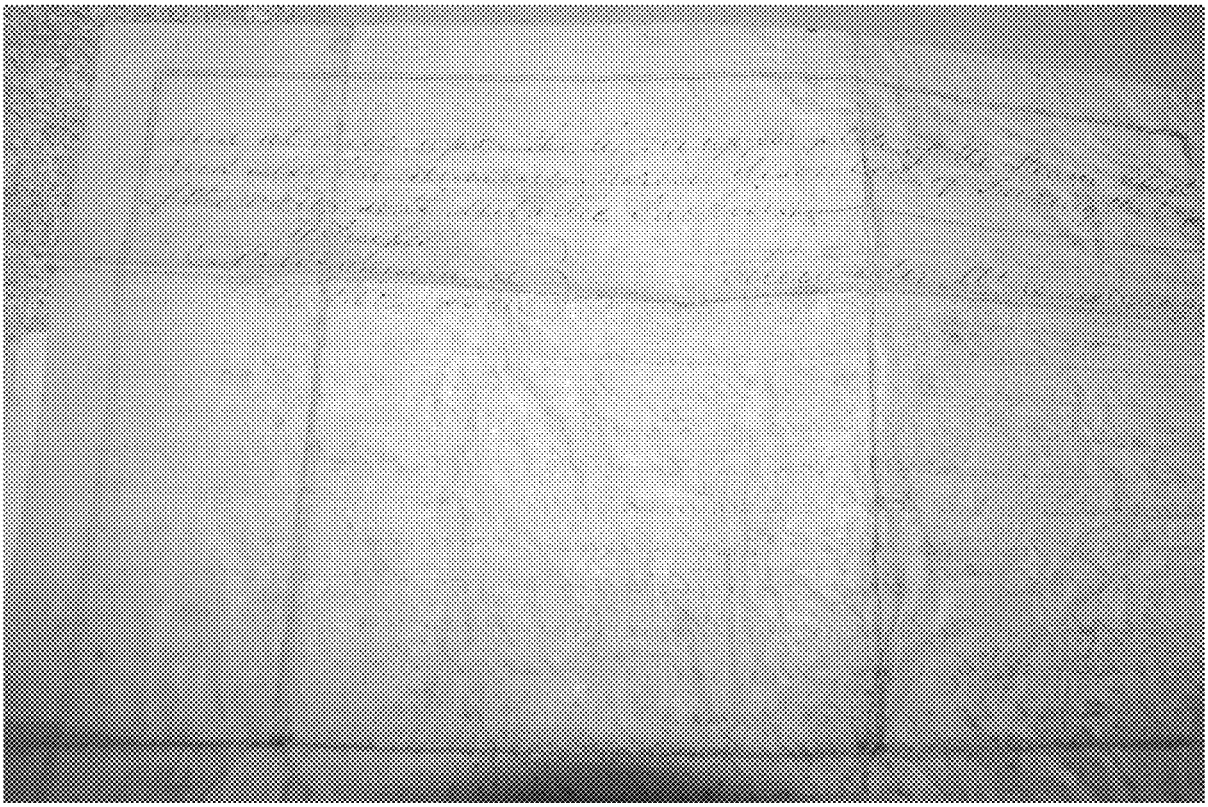

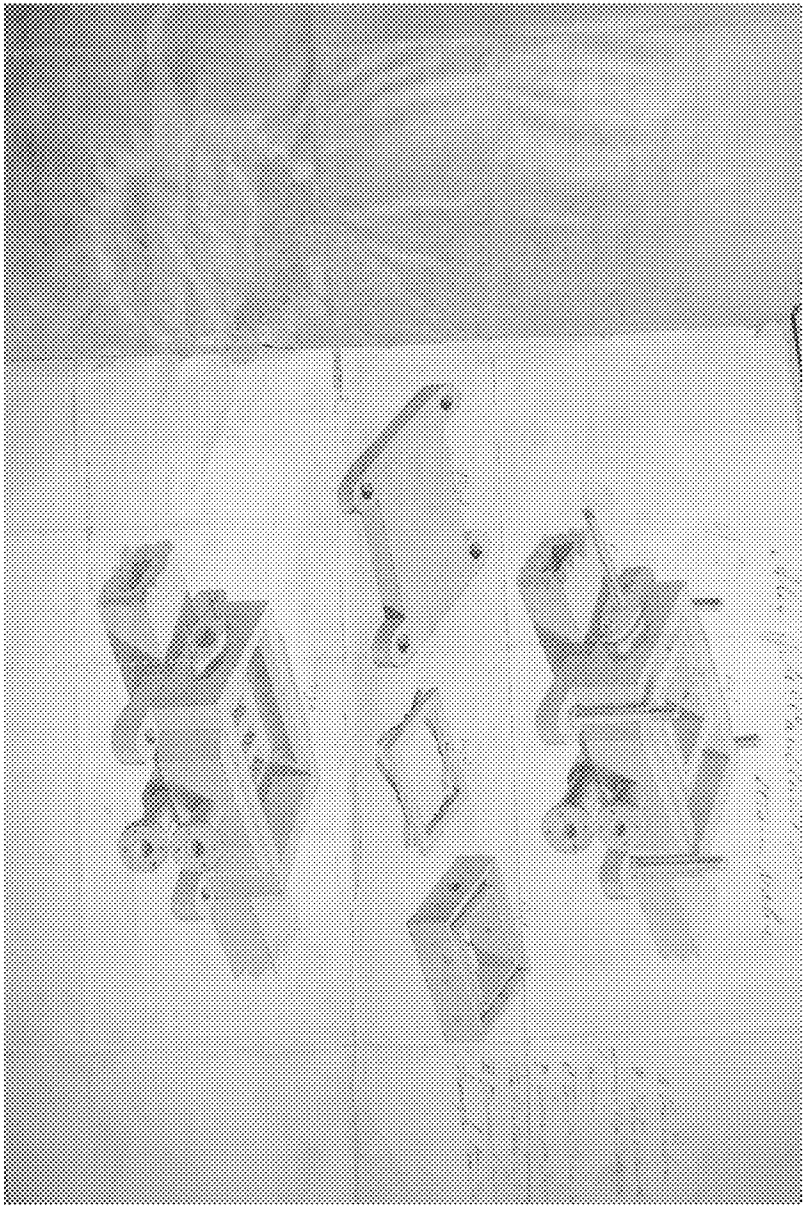

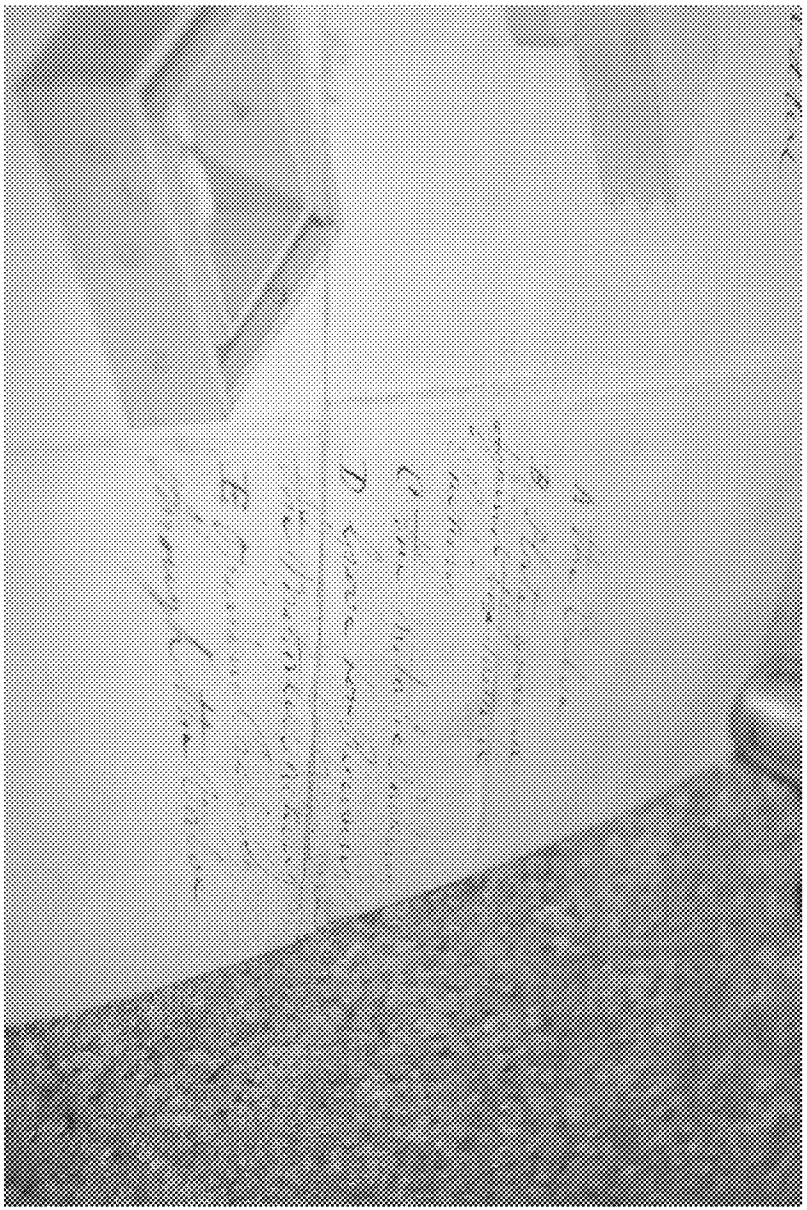

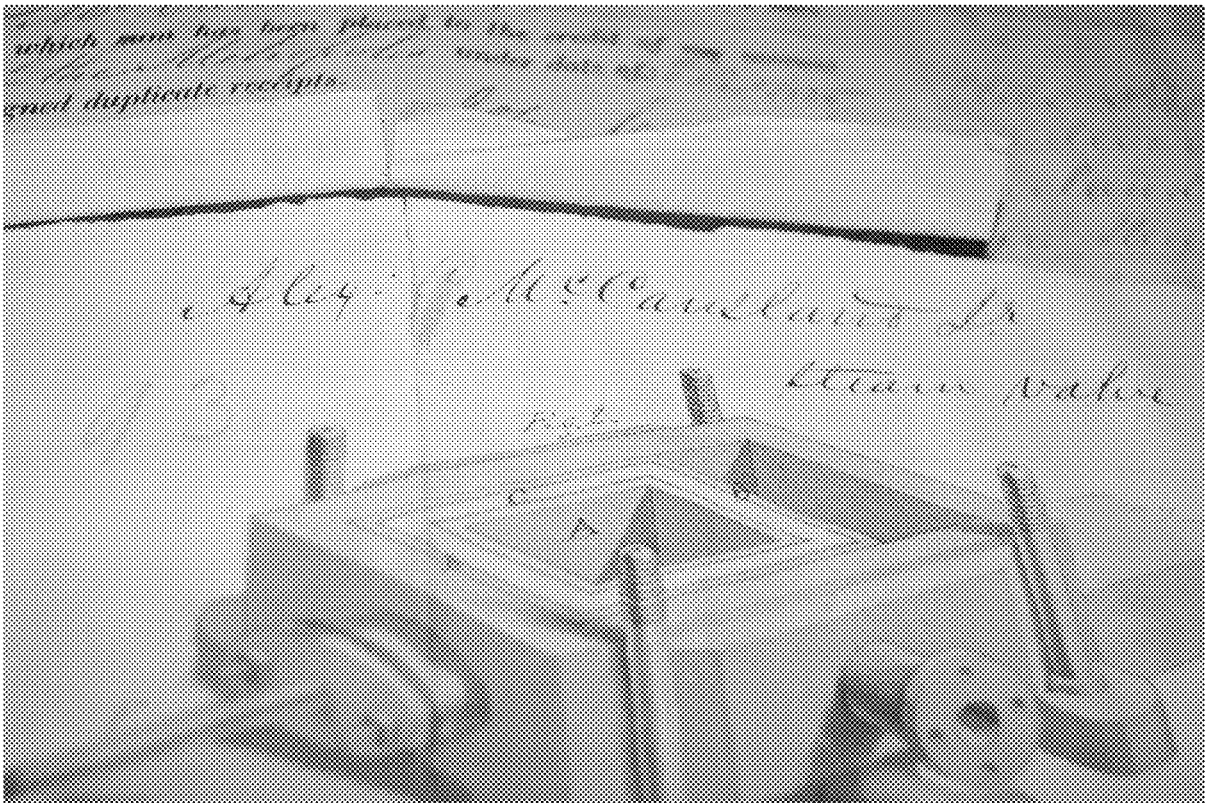

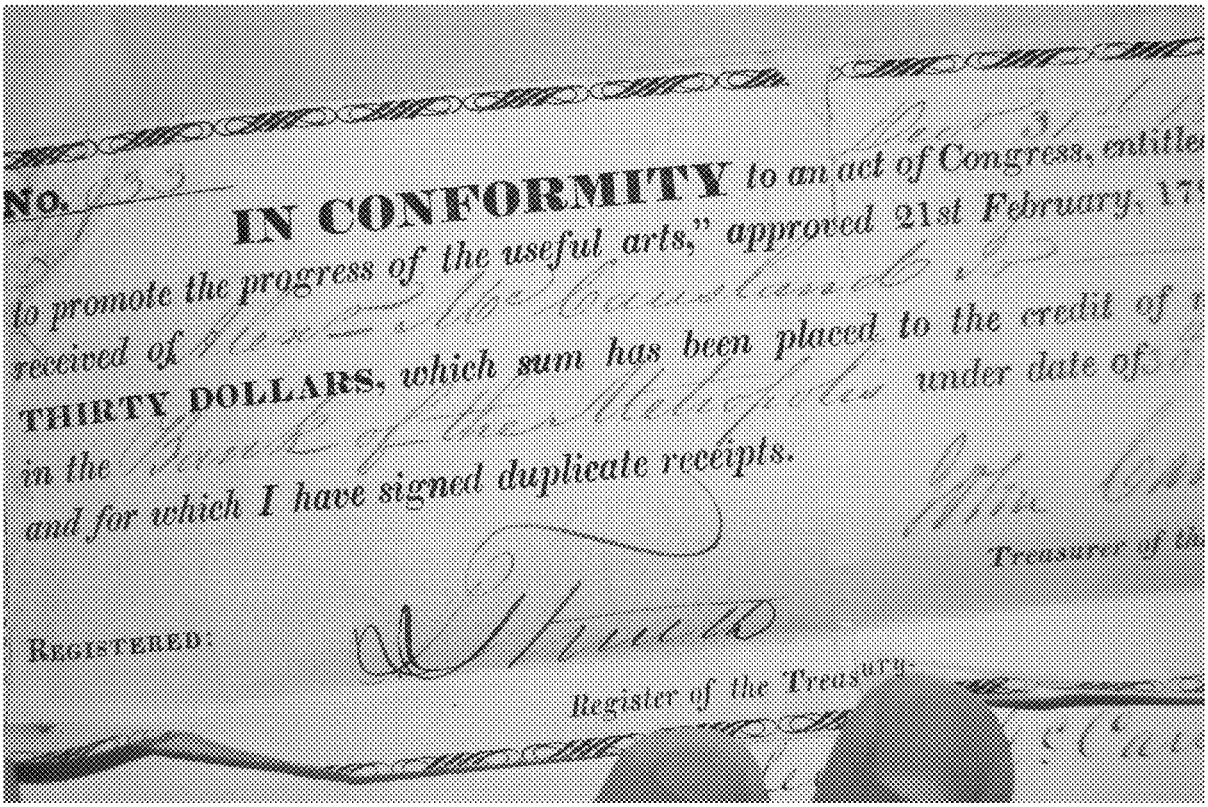
NO.
IN CONFORMITY *to an act of Congress, entitle*
*to promote the progress of the useful arts," approved 21st February, 17*
*received of*
THIRTY DOLLARS, *which sum has been placed to the credit of*
*in the* *under date of*
*and for which I have signed duplicate receipts.*
*Treasurer of*
REGISTERED:
*Register of the Treasury.*

—

COPY CERTIFICATION BY DOCUMENT CUSTODIAN

State of California )
County of Orange )

I, Jami Rogers hereby swear (or affirm) that the attached reproduction of

The United States of America patent number 81
dated 1836 has the signature from President Andrew
Jackson. It contains a seal and ribbon affixed to the
document is white and the ribbon is yellaw in color
The document addresses one Alexander McCausland Junior.
The document indicated that it is being awarded regarding. "In the slide valve for a steam engines."

Is a true correct and complete photocopy of a document in my possession.

[illegible] (Signature of Custodian)

4081 Belvedere St., Irvine, Ca 92604 (address)

Subscribed and sworn to (or affirmed) before me on this 12 day of July, 2011

By Jami Rogers who proved to me on the basis of satisfactory evidence to be the person(s) who appeared before me.

D. L. SMITH
Notary Public

D L Smith

Notary Signature

Seal

D. L. SMITH
COMM...1814206
NOTARY PUBLIC-CALIFORNIA
ORANGE COUNTY
My Term Exp. Sept. 20, 2012
BCT3